US007297964B2

(12) United States Patent
Savagian et al.

(10) Patent No.: US 7,297,964 B2
(45) Date of Patent: Nov. 20, 2007

(54) PHOTOLUMINESCENT WALL MARKER AND METHOD OF MAKING

(75) Inventors: Michael D. Savagian, Germantown, WI (US); Steven H. Mess, Franklin, WI (US)

(73) Assignee: Brady Worldwide, Inc., Milwaukee, WI (US)

( * ) Notice: Subject to any disclaimer, the term of this patent is extended or adjusted under 35 U.S.C. 154(b) by 0 days.

(21) Appl. No.: 11/311,008

(22) Filed: Dec. 19, 2005

(65) Prior Publication Data

US 2007/0138408 A1 Jun. 21, 2007

(51) Int. Cl.
*G01N 21/64* (2006.01)

(52) U.S. Cl. ..................... 250/466.1; 40/542; 52/287.1

(58) Field of Classification Search ............ 250/466.1; 40/542; 52/287.1
See application file for complete search history.

(56) References Cited

U.S. PATENT DOCUMENTS

| | | | | |
|---|---|---|---|---|
| 2,387,512 | A | 10/1945 | Hilberg | |
| 4,401,050 | A | 8/1983 | Britt et al. | |
| 5,415,911 | A | 5/1995 | Zampa et al. | |
| 5,724,909 | A | 3/1998 | Pitman et al. | |
| 5,904,017 | A * | 5/1999 | Glatz et al. | 52/287.1 |
| 6,237,266 | B1 * | 5/2001 | Tassey et al. | 40/542 |
| 6,253,478 | B1 | 7/2001 | Kalavity | |
| 6,307,207 | B1 * | 10/2001 | Burbank | 250/462.1 |
| 6,487,802 | B2 | 12/2002 | Suen | |
| 6,508,900 | B1 | 1/2003 | Kendall et al. | |
| 2005/0106995 | A1 * | 5/2005 | Kim | 446/473 |

OTHER PUBLICATIONS www.mss-int.com/space1.html.*

* cited by examiner

*Primary Examiner*—David Porta
*Assistant Examiner*—Christine Sung
(74) *Attorney, Agent, or Firm*—Quarles & Brady LLP

(57) ABSTRACT

A photoluminescent wall marker includes an elongated base having an upper edge and a lower edge. The lower edge of the base is integral with an upper edge of a photoluminescent panel. The upper edge of the photoluminescent panel is integral with the base lower edge and defined by a fold line extending longitudinally between the base and the photoluminescent panel. The base and photoluminescent panel are flexible in a transverse direction allowing the wall marker to be stored in roll form in an unassembled configuration.

20 Claims, 4 Drawing Sheets

PHOTOLUMINESCENT WALL MARKER AND METHOD OF MAKING

CROSS REFERENCES TO RELATED APPLICATIONS

Not Applicable.

STATEMENT REGARDING FEDERALLY SPONSORED RESEARCH

Not Applicable.

TECHNICAL FIELD

This invention relates to photoluminescent wall markers, and in particular to a roll up, fold up photoluminescent wall marker.

DESCRIPTION OF THE BACKGROUND ART

Photoluminescent marking of egress pathways has gained importance over the past ten years. This is the result of both the advent of high performance, long afterglow strontium aluminate pigments, and the recognition of the need for illuminated pathway markings in emergency, blackout conditions. In densely populated buildings, increasing safety cues can result in less hesitation during emergency exits. For these reasons, it is becoming common to require that emergency exits be marked with photoluminescent guidance systems. An example of a photoluminescent guidance sign is shown in U.S. Pat. No. 6,487,802.

Guidance cues can be provided by marking the edges of the egress pathway. This is usually done low to the ground, as in many emergencies there is the presence of smoke, and combustion by products, which rise due to heat. As a result the clearest view is of the lowest portions of a pathway. For this reason the optimum placement of egress markings is on either the floor, or the lowest portion of the wall. An example of this type of product is shown in U.S. Pat. No. 5,904,017, where a photoluminescent strip is extruded into a floor molding, or other attachable material.

Commercial, long afterglow photoluminescent signs, markers, and tapes are usually compounded from strontium aluminate pigments. Other pigments, such as zinc sulfide can also be used, however the performance isn't quite as long lasting. All of the pigments behave in the same general way by absorbing ultraviolet (UV) light radiation and discharging visible light. When the UV light source is removed, the afterglow of visible light discharge continues for some time, although it does decay eventually. The useful life of a photoluminescent sign, during a blackout, is dependant on this property. Without sufficient UV light to charge the sign, the afterglow is limited.

Emergency exits of many buildings are illuminated by fluorescent lighting. Fluorescent lighting works by the internal UV discharge causing the fluorescent coated layer to charge and give off visible light. This effect is not photoluminescent, because as soon as the UV charging is removed, the fluorescence ceases. The output of a fluorescent lamp is primarily visible light, however a small percentage of the UV light is emitted through the coated layer and the glass. This allows a fluorescent lamp to be used as a source for charging photoluminescent signs, markers, and tapes. While illumination levels in an office space may be high, to allow for efficient operations, illumination levels in emergency exit pathways is kept to a much lower level for energy efficiency. This level varies, depending upon the building code in effect and the building owner's preference. In one large metropolitan city, the minimum level can be as low as 2 foot-candles. Making the most efficient use of the illumination provided is an important factor in providing the most conspicuous egress marking.

Photoluminescent egress marking can be applied to the floor, providing a photoluminescent surface that is nearly perpendicular to overhead illumination and, depending upon observer position and height, at a close to perpendicular angle to viewing as well. This generally results in both good illumination of the photoluminescent tape as well as good, viewable brightness of the marker luminance in black-out conditions.

Sometimes the egress marking cannot be applied to the floor, either due to a difficult to bond surface, difficulty in cleaning or otherwise preparing the surface for bonding, or other obstacles. In this case the marking is applied along the lower portion of the wall, near the floor. If a flat tape-like material is used, with its photoluminescent surface parallel to the wall, the tape is at an acute angle to both illumination from overhead lighting and observation by an upright viewer. This angle can diminish the effectiveness of the marking and slow recognition by the viewer in a black-out, emergency situation.

A solution to the problem of the performance of wall mounted photoluminescent markings is to mount the marking at an angle to the wall. The greater the angle, the more illumination will be provided to it by the overhead lighting and the more observable it will be in a black-out by an upright viewer. This has been recognized by some providers of photoluminescent wall markings in the form of an angled mount for a photoluminescent tape or insert to be applied to. Angled mounts can be manufactured from either stamped or extruded metal or plastic.

The disadvantage of the current angled mounts is that they must be made in rigid lengths. Providing the angle feature requires the mount to have a significant third dimension, which adds greatly to its longitudinal stiffiness. This means that the length of the mounts is restricted to the greatest length that can be efficiently made, stored, transported, and installed. Even eight foot lengths present a challenge for convenient handling, especially when being transported up emergency exits on multi-story buildings. Flat tapes and flat mounts for tapes and markings can be provided and dispensed from convenient rolls in much greater lengths, but do not supply the angled display feature. Accordingly, a need exists for an effective photoluminescent wall marker that can be efficiently stored and transported.

SUMMARY OF THE INVENTION

The present invention provides a photoluminescent wall marker including upwardly facing photoluminescent material and can be stored in roll form. In one embodiment, the wall marker includes an elongated base having an upper edge and a lower edge. The lower edge of the base is integral with an upper edge of a photoluminescent panel. The upper edge of the photoluminescent panel is integral with the base lower edge and defined by a fold line extending longitudinally between the base and the photoluminescent panel. The base and photoluminescent panel are flexible in a transverse direction allowing the wall marker to be stored in roll form in an unassembled configuration.

A general objective of the present invention is to provide an effective wall marker that can be efficiently stored and transported. This objective is accomplished by providing a wall marker that can be stored in roll form and dispensed with an angled photoluminescent panel.

The foregoing and other objectives and advantages of the invention will appear from the following description. In the description, reference is made to the accompanying drawings which form a part hereof, and in which there is shown by way of illustration a preferred embodiment of the invention. Such embodiment does not necessarily represent the full scope of the invention, however, and reference is made therefore to the claims herein for interpreting the scope of the invention.

DETAILED DESCRIPTION OF THE PREFERRED EMBODIMENTS

Figure 1:
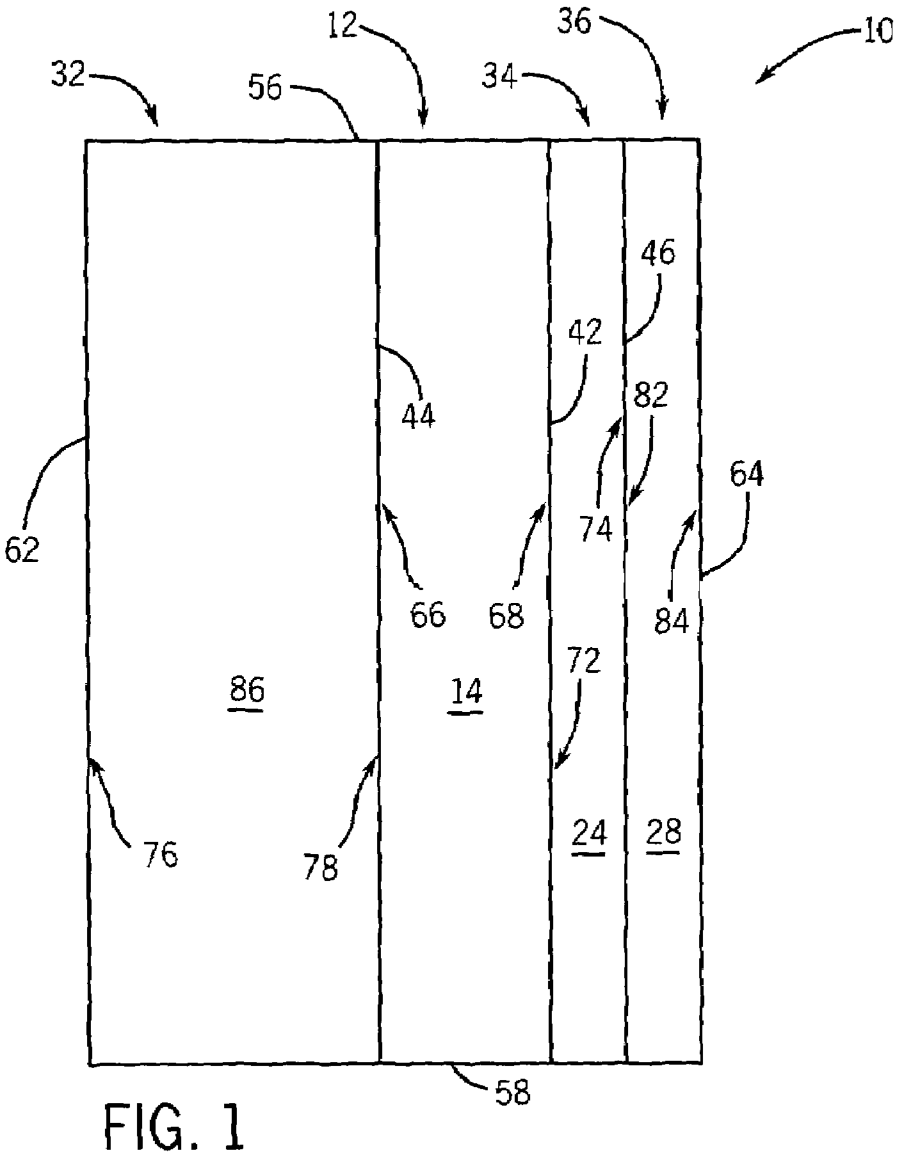
FIG. 1 is a plan view of a wall marker incorporating the present invention in an unassembled configuration.
Figure 2:
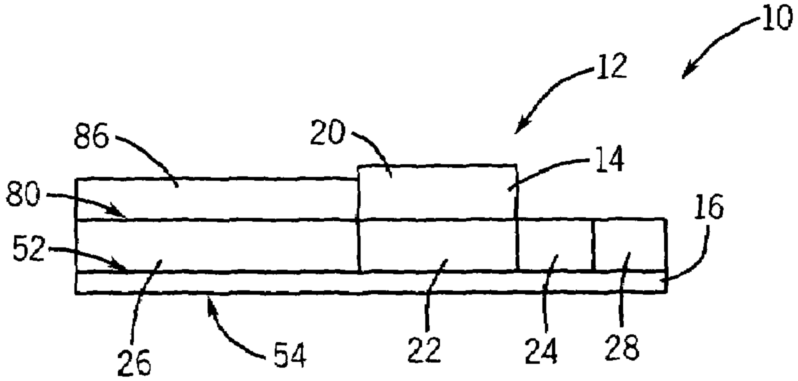
FIG. 2 is an end view of the wall marker of FIG. 1.
Figure 3:
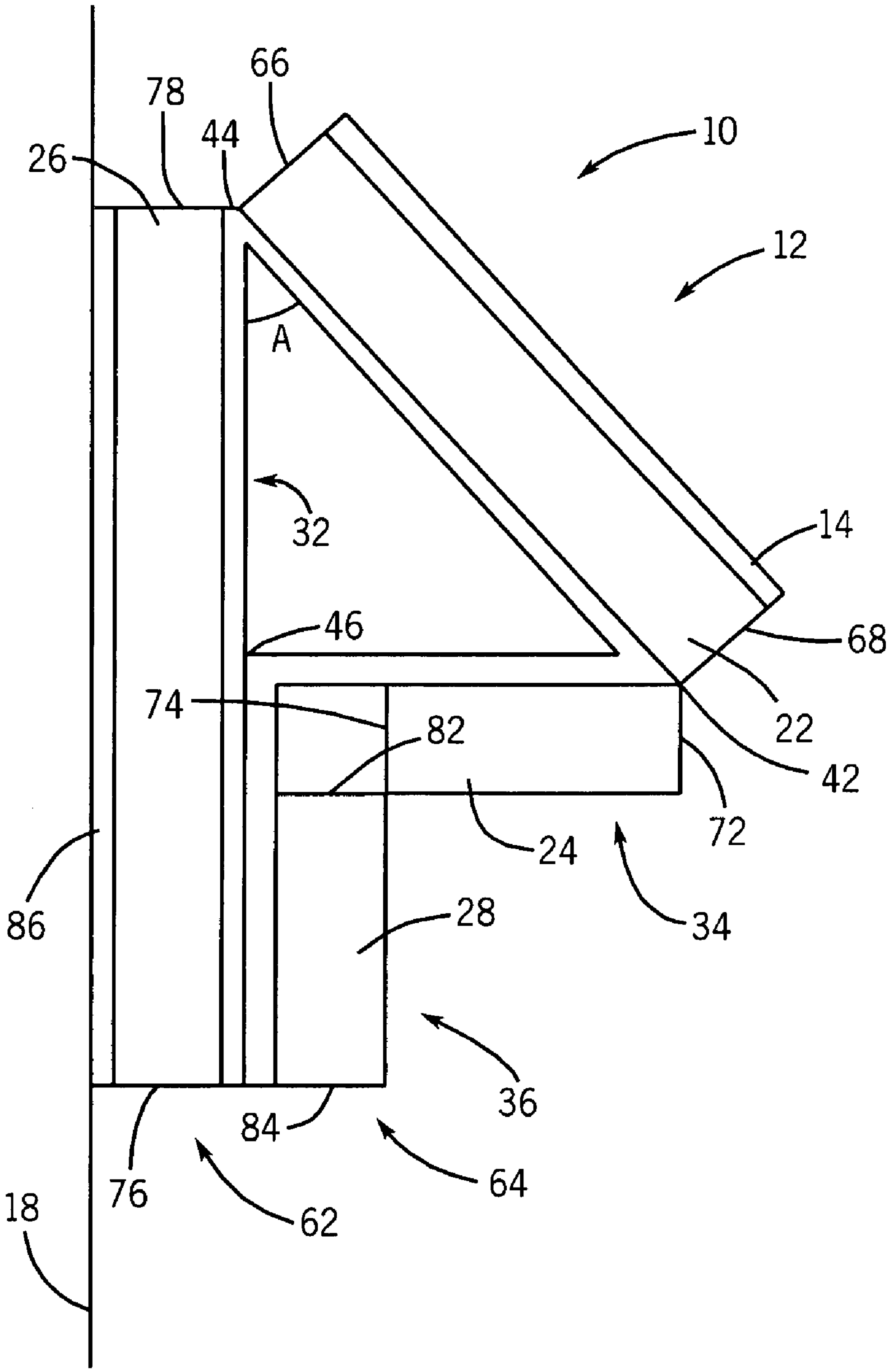
FIG. 3 is an end view of the wall marker of FIG. 1 in an assembled configuration.

A preferred embodiment of a photoluminescent wall marker 10 shown in FIGS. 1-3 can be stored and transported in an unassembled configuration (FIGS. 1 and 2) in roll form and dispensed in an elongated strip that is folded to form a three-dimensional structure in an assembled configuration (FIG. 3) for affixing to a wall 18. The three-dimensional structure includes an upwardly facing photoluminescent panel 12 having a photoluminescent material 14 charged by ambient light.

The wall marker 10 includes an elongated substrate 16 on which strips 20, 22, 24, 26, 28 of stiffening material and the photoluminescent material 14 are affixed defining a base 32, the photoluminescent panel 12, a support segment 34, and an anchor 36. Preferably, the base 32, photoluminescent panel 12, support segment 34, and anchor 36 are separated from each other by fold lines 42, 44, 46 extending substantially the entire length, i.e. in a longitudinal direction, of the elongated substrate 16. Advantageously, the stiffening material has sufficient flexibility along the transverse direction, i.e. transverse to the longitudinal direction, to be wound into a roll having an axis substantially transverse to the fold lines 42, 44, 46 which allows the wall marker 10 to be rolled into roll form for storage and shipping.

The substrate 16 is a length of elongated flexible material which integrally joins the base 32, photoluminescent panel 12, support segment 34, and anchor 36 at their respective edges. The substrate 16 includes a top surface 52 and a bottom surface 54 defined between ends 56, 58 and elongated upper and lower edges 62, 64. Preferably, the substrate 16 has a width (i.e. the distance between the edges 62, 64) substantially equal to the width of the wall marker 10 in the unfolded unassembled configuration. In a preferred embodiment, the substrate 16 is a tape material having an adhesive, such as a pressure sensitive adhesive, heat-activated adhesive, and the like, applied to the bottom surface 54. The tape material can be any single or multi-layer material known in the art, such as paper, plastic, metal, a combination thereof, and the like, without departing from the scope of the invention.

The strip 20 of photoluminescent material 14 forming the photoluminescent panel 12 having upper and lower edges 66, 68 is fixed relative to the top surface 52 of the substrate 16 along the length of the substrate 16 between the substrate longitudinal edges 62, 64. Preferably, the strip 20 of photoluminescent material 14 is a photoluminescent tape including strontium aluminate pigments which absorb ultraviolet light radiation and discharge visible light. Of course, other photoluminescent materials can be used, such as zinc sulfide, without departing from the scope of the invention. A photoluminescent panel strip 22 of stiffening material interposed between the strip 20 of photoluminescent material 14 and substrate 16 stiffens the upwardly facing photoluminescent panel 12.

In the embodiment disclosed in FIGS. 1-3, additional strips 24, 26, 28 of stiffening material are provided to increase the rigidity of the wall marker 10 when in the assembled configuration. A support segment strip 24 of stiffening material forming the support segment 34 having upper and lower edges 72, 74 is fixed to the top surface 52 of the substrate 16 adjacent to the photoluminescent panel 12. Preferably, the support segment 34 is separated from the photoluminescent panel 12 by the fold line 42 extending the length of the substrate 16 between the upper edge 72 of the support segment 34 and the lower edge 68 of the photoluminescent panel 12. In the assembled configuration, the wall marker 10 is folded along the fold line 42 to form the support segment 34 extending from the lower edge 68 of the photoluminescent panel 12 toward the base 32 and stiffened by the stiffening material. The support segment 34 spaces the lower edge 68 of the photoluminescent panel 12 from the base 32, and thus the wall 18 when affixed thereto, to face the photoluminescent material 14 upwardly.

A base strip 26 of stiffening material forming the base 32 having upper and lower edges 76, 78 is affixed to the top surface 52 of the substrate 16 between the upper edge 66 of the photoluminescent panel 12 and upper edge 62 of the substrate 16. In the assembled configuration, the wall marker 10 is folded along the fold line 44 between the base strip 26 of stiffening material and photoluminescent panel 12 to form the base 32 affixable to the wall 18. In the embodiment disclosed herein, a doubled sided pressure sensitive adhesive tape 86 affixed to a top surface 80 of the base strip 26 of stiffening material adhesively fixes the base 32, and thus the wall marker 10, to the wall 18.

An anchor strip 28 of stiffening material forming the anchor 36 having upper and lower edges 82, 84 is fixed to the top surface 52 of the substrate 16 between the lower edge 74 of the support segment 34 and lower edge 64 of the substrate 16. In the assembled configuration, the wall marker 10 is folded along the fold line 46 between the anchor strip 28 of stiffening material and support segment 34 to form the anchor 36 affixed, such as by the adhesive on the bottom surface 54 of the substrate 16, to the base 32. The anchor 36 fixes the height of the lower edge 74 of the support segment 34 relative to the base 32 to ensure the photoluminescent panel 12 faces upwardly.

The strips 22, 24, 26, 28 of stiffening material extend along substantially the entire length of the substrate 16. Preferably, the strips 22, 24, 26, 28 of stiffening material are sufficiently thin to allow a user to easily cut through the stiffening material when cutting the wall marker 10 to a desired length. However, the strips 22, 24, 26, 28 of stiffening material can be discontinuous having transverse cut lines (not shown) void of stiffening material that allow a user to cut the wall marker 10 to predetermined lengths without having to cut through the stiffening material. Advantageously, a plurality of transverse cut lines can also be provided to increase the flexibility of the wall marker 10 in the transverse direction.

The stiffening material can be any material that adds rigidity to the wall marker 10 in the longitudinal direction. Preferably, the stiffening material is a metal, such as full hard aluminum foil having a thickness of approximately 0.008 inches which is joined to the substrate 16. Advantageously, the metal foil provides sufficient rigidity to the wall marker 10 while allowing the wall marker 10 to be rolled up into a roll. Of course other stiffening materials, such as other metals, plastic, paper, and the like, can be used without departing from the scope of the invention. Moreover, the stiffening material can be joined to the substrate 16, as described below, or formed as an integral part of the substrate, such as by extruding the substrate and strips 22, 24, 26, 28 of stiffening material together as a single piece, without departing from the scope of the invention.

The wall marker 10 can be made starting with a 1.0 inch wide photoluminescent tape laminated to a first strip of metal foil of about the same width to form the strip 20 of photoluminescent material 14 affixed to the photoluminescent panel strip 22 of stiffening material. A second strip of metal foil approximately 1.5 inches wide is then affixed to one side of the double sided pressure sensitive adhesive tape 86 to form the base strip 26 of stiffening material having an adhesive coated top surface 80. A release liner (not shown) covering the adhesive on the other side of the double sided pressure sensitive adhesive tape 86 is left in place until the wall marker 10 is adhesively affixed to the wall 18.

The base strip 26 of stiffening material is then affixed to a non-adhesive side (top surface 52) of a 3.5 inch wide strip of adhesive tape forming the substrate 16 having an adhesive side. Of course, a double-sided adhesive tape can be used as the substrate 16, and the base strip 26 of stiffening material can be affixed to an adhesive side of the tape without departing from the scope of the invention. One edge of the base strip 26 of stiffening material is aligned with the upper edge 62 of the substrate 16 to form the base 32 of the wall marker 10 which can be adhesively fixed to the wall 18 using the outwardly facing side of the double sided pressure sensitive adhesive tape 86 affixed to the base strip 26 of stiffening material.

The 1.0 inch wide photoluminescent tape laminated to the photoluminescent panel strip 22 of stiffening material is then affixed to the top surface 52 of the substrate 16 adjacent to the base strip 26 of stiffening material forming the photoluminescent panel 12. The support segment strip 24 of stiffening material, in the form of a 0.5 inch wide metal foil, is then affixed to the top surface 52 of the substrate 16 adjacent to the photoluminescent panel strip 22 of stiffening material on which the photoluminescent material 14 is affixed. Finally, the anchor strip 28 of stiffening material in the form of a 0.5 inch wide metal foil, is then affixed to the top surface 52 of the substrate 16 adjacent to the support segment strip 24 of stiffening material to form the anchor 36 and complete the wall marker 10 in the unassembled configuration, as shown in FIG. 1. Advantageously, following the application of the anchor strip 28 of stiffening material to the substrate 16, the wall marker 10 in the unassembled configuration can be rolled up into roll form for easy storage and shipping.

Although the strips 20, 22, 24, 26, 28 of stiffening material and photoluminescent material 14 are described above as being affixed to the substrate 16 sequentially, the strips 20, 22, 24, 26, 28 can be applied to the substrate 16 simultaneously, as a single strip of foil having a width substantially equal to the substrate 16 followed by a strip of photoluminescent material 14, or individually in a staggered fashion without departing from the scope of the invention. In addition, the widths of the strips 20, 22, 24, 26, 28, or spacing of the fold lines 42, 44, 46, can be varied to change the angle A of the upwardly facing photoluminescent panel 12, such that the angle of the photoluminescent panel 12 ranges from nearly vertical to nearly horizontal without departing from the scope of the invention.

Preferably, the fold lines 42, 44, 46 are predetermined longitudinal lines formed by abutting the strips 22, 24, 26, 28 of stiffening material, as disclosed above, to provide longitudinal lines between the strips 22, 24, 26, 28 of stiffening material that are easy to fold. Alternatively, marks formed, such as by etching, embossing, printing, creasing, and the like, can be made on the wall marker 10 indicating where the user folds the wall marker 10 to transform the wall marker 10 from the unassembled configuration to the assembled configuration.

In use, a length of the wall marker 10 is unrolled in the unassembled configuration from a roll and cut to the desired length. The base 32 of the wall marker 10 is folded back away from the photoluminescent panel 12 along the fold line 44 between the base 32 and photoluminescent panel 12. The support segment 34 is then folded back away from the photoluminescent panel 12 along the fold line 42 between the support segment 34 and photoluminescent panel 12. The anchor 36 is then folded downwardly from the support segment 34 and the release liner (not shown) is removed to expose the adhesive on the bottom surface 54 of the substrate 16. The edges 62, 64 of the substrate 16 are then aligned, and the anchor 36 is pressed against the adhesively coated bottom surface 54 of the substrate 16 to adhesively affix the anchor 36 to the base 32 and form the wall marker 10 in the assembled configuration.

A user affixes the wall marker 10 to the wall 18 by removing the release liner covering the adhesive on the top surface 80 of the base strip 26 of stiffening material forming the base 32 and positioning the wall marker 10, such that the photoluminescent panel 12 faces upwardly. The base 32 of the wall marker 10 is then pressed against the wall 18 to adhesively fix the base 32, and thus the wall marker 10, to the wall 18. Although adhesively fixing the wall marker 10 to the wall 18 is disclosed, the wall marker 10 can be fixed to the wall 18 using other methods, such as mechanical fasteners, without departing from the scope of the invention.

Figure 4:
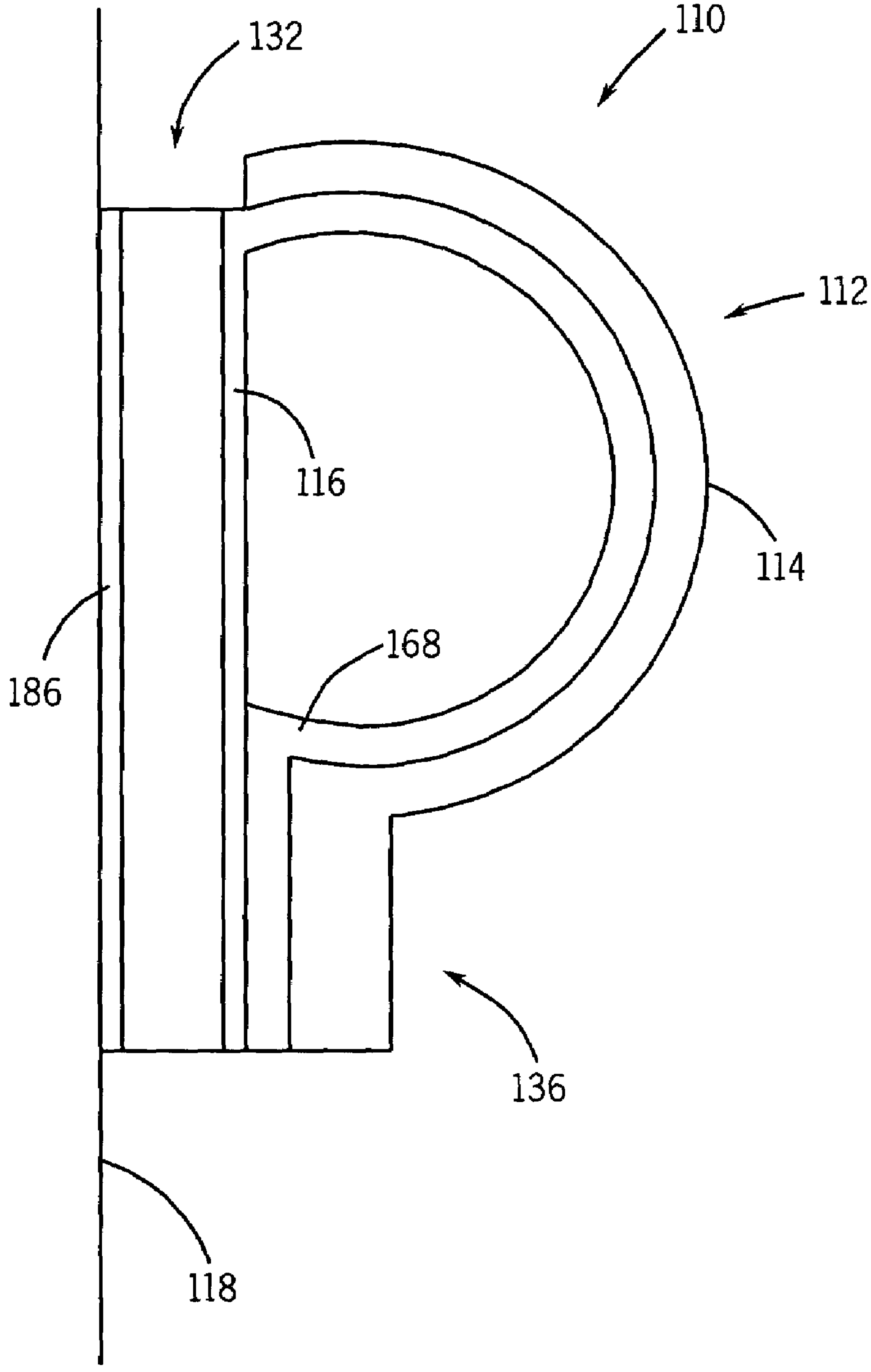
FIG. 4 is an end view of another embodiment of a wall marker incorporating the present invention.

Another embodiment of a photoluminescent marker 110 disclosed in FIG. 4, includes a photoluminescent panel 112 in which only a portion of the photoluminescent material 114 faces upwardly in an assembled configuration. This particular embodiment is suitable for use in an area in which sufficient light is reflected off of a floor to charge the downwardly facing photoluminescent material 114, the marker 110 is placed on a horizontal surface, or the marker 110 is placed at a height on the wall 118 in which the downwardly facing photoluminescent material 114 receives sufficient light from other sources.

As shown in FIG. 4, the wall marker 110 includes the photoluminescent panel 112 interposed between a base 132 and an anchor 136 integrally joined by an elongated substrate 116. As in the embodiment disclosed in FIGS. 1-3, the base 132 includes an adhesive tape 186 that affixes the wall marker 110 to the wall 118. Likewise, the anchor 136 fixes a lower edge 168 of the photoluminescent panel 112 relative to the base 132. In this embodiment, however, the photoluminescent panel 112 bows outwardly away from the base 132. As a result, only a portion of photoluminescent material 114 faces upwardly when affixed to the wall 118 in the assembled configuration.

Figure 5:
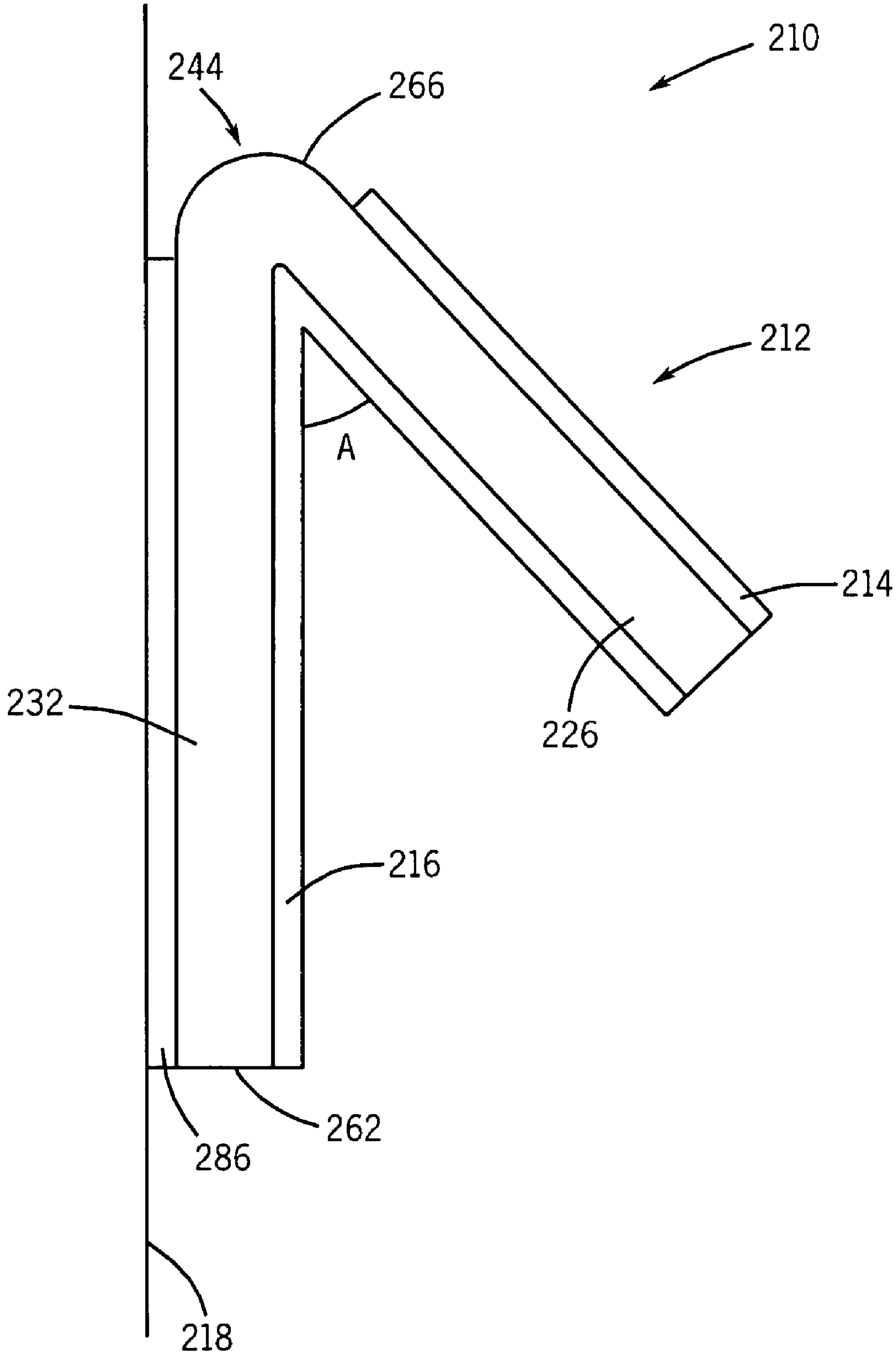
FIG. 5 is an end view of yet another embodiment of a wall marker incorporating the present invention.

In a third embodiment shown in FIG. 5, a wall marker 210 incorporating the present invention includes an elongated substrate 216 on which a strip 226 of stiffening material is affixed. The strip 226 of stiffening material is folded along a fold line 244 extending in the longitudinal direction along the strip 226 of stiffening material to support a photoluminescent panel 212 integrally joined to a base 232. The photoluminescent panel 212 includes a strip of photoluminescent material 214, as described above. Likewise, the base 232 includes an adhesive tape 286 that adhesively fixes the wall marker 210 to a wall 218. Although, the stiffening material disclosed in FIG. 5 extends laterally a distance between an upper edge 266 of the photoluminescent panel 212 toward an upper edge 262 of the substrate 216 to stiffen the base 232 fixed to the wall 218, the stiffening material can be provided only across the fold line 244 to support the photoluminescent panel 212 at a desired angle in an upwardly facing position without departing from the scope of the invention. Of course, if the strip 226 of stiffening material extends across the entire width of the wall marker 210, a separate substrate 216 is not required.

The present invention is not limited to the above described applications, and one skilled in the art will be able to incorporate the present invention into other applications that fall within the scope of the claims. Moreover, while there has been shown and described what is at present considered the preferred embodiment of the invention, it will be obvious to those skilled in the art that various changes and modifications can be made therein without departing from the scope of the invention defined by the appended claims.

We claim:

1. A photoluminescent wall marker, said wall marker comprising:
- an elongated substrate having a top surface and a bottom surface;
- a fold line formed in said substrate and extending along a length of said substrate;
- a strip of photoluminescent material affixed to said top surface extending along a length of said substrate;
- a strip of stiffening material affixed to said top surface adjacent said strip of photoluminescent material, wherein said marker is storable in roll form and upon being dispensed is folded along said fold line to face at least a portion of said strip of photoluminescent material upwardly when fixing said wall marker to a wall.

2. The wall marker as in claim 1, in which said fold line is formed between said strip of stiffening material and said strip of photoluminescent material.

3. The wall marker as in claim 1, in which said strip of stiffening material extends across said fold line to support said portion of said strip of photoluminescent material upwardly when fixing said wall marker to a wall.

4. The wall marker as in claim 1, including an adhesive applied to said top surface of said substrate.

5. The wall marker as in claim 1, in which said photoluminescent material is applied over a strip of stiffening material.

6. The wall marker as in claim 1, in which said stiffening material is metal.

7. The wall marker as in claim 1, in which said stiffening material is formed as an integral part of said substrate.

8. A method of using a photoluminescent wall marker, said method comprising:
- unrolling a length of wall marker from a roll, said wall marker including a strip of photoluminescent material affixed to an elongated substrate;
- folding said substrate along a fold line extending the length of said length of wall marker adjacent said strip of photoluminescent material;
- affixing said substrate to a wall with at least a portion of said photoluminescent material facing upwardly.

9. The method as in claim 8, in which affixing said substrate to said wall includes adhesively affixing said substrate to said wall.

10. The method as in claim 8, in which folding said substrate along a fold line includes folding said substrate along a fold line between a strip of stiffening material and said strip of photoluminescent material.

11. The method as in claim 10, including affixing said stiffening material to said substrate adjacent to said strip of photoluminescent material.

12. The method as in claim 11, in which said stiffening material is a metal.

13. The method as in claim 8, in which said strip of photoluminescent material is fixed to a stiffening material affixed to said substrate.

14. The method as in claim 8, including rolling said wall marker into a roll about an axis transverse to said fold line.

15. A photoluminescent wall marker, said wall marker comprising:
- an elongated base having an upper edge and a lower edge;
- a photoluminescent panel having an upper edge and a lower edge, said upper edge of said photoluminescent panel being integral with said base lower edge and being defined by a fold line extending longitudinally between said base and said photoluminescent panel, said base and photoluminescent panel being flexible in a transverse direction allowing the wall marker to be stored in roll form in an unassembled configuration.

16. The wall marker as in claim 15, including a strip of stiffening material extending across said fold line to support said photoluminescent panel facing upwardly.

17. The wall marker as in claim 15, including a support segment having an upper edge and a lower edge, said upper edge of said support segment being integral with said photoluminescent panel lower edge and being defined by a fold line extending longitudinally between said support segment and said photoluminescent panel, said support segment spacing said photoluminescent panel lower edge from said base in an assembled configuration.

18. The wall marker as in claim 17, including an anchor having an upper edge and a lower edge, said upper edge of said support segment being integral with one of said photoluminescent panel lower edge and said support segment and being defined by a fold line extending longitudinally between said support segment and said one of said photoluminescent panel lower edge and said support segment lower edge, said anchor anchoring said one of said photoluminescent panel lower edge and said support segment lower edge relative to said base in an assembled configuration.

19. The wall marker as in claim 15, in which photoluminescent panel includes a photoluminescent material applied over a strip of stiffening material.

20. The wall marker as in claim 16, in which said stiffening material is metal.

* * * * *

UNITED STATES PATENT AND TRADEMARK OFFICE
CERTIFICATE OF CORRECTION

PATENT NO. : 7,297,964 B2
APPLICATION NO. : 11/311008
DATED : November 20, 2007
INVENTOR(S) : Savagian et al.

It is certified that error appears in the above-identified patent and that said Letters Patent is hereby corrected as shown below:

Column 2, Line 39:
"stiffniess" should be
--stiffness--

Signed and Sealed this

Twenty-fourth Day of June, 2008

JON W. DUDAS
*Director of the United States Patent and Trademark Office*